United States Patent [19]

Chapman et al.

[11] Patent Number: 4,675,611
[45] Date of Patent: Jun. 23, 1987

[54] METHOD OF LOGGING AN EARTH FORMATION PENETRATED BY A BOREHOLE TO PROVIDE AN IMPROVED ESTIMATE OF IMPEDANCE DISTRIBUTION OF THE FORMATION

[75] Inventors: Carroll W. Chapman, Anaheim; Jorg A. Angehrn, Brea, both of Calif.

[73] Assignee: Chevron Research Company, San Francisco, Calif.

[21] Appl. No.: 761,122

[22] Filed: Jul. 31, 1985

[51] Int. Cl.⁴ ................................................ G01V 3/18
[52] U.S. Cl. ..................................... 324/366; 324/347; 364/422
[58] Field of Search ............... 324/323, 339, 341, 344, 324/347, 366, 373, 375; 364/422

[56] References Cited

U.S. PATENT DOCUMENTS

| | | | |
|---|---|---|---|
| 3,076,138 | 1/1963 | Stelzer | 324/366 |
| 3,256,480 | 6/1966 | Runge et al. | 324/366 |
| 3,457,499 | 7/1969 | Tanguy | 324/323 |
| 3,882,376 | 5/1975 | Schuster | 324/373 |
| 4,087,740 | 5/1978 | Suau | 324/373 |
| 4,087,741 | 5/1978 | Mufti | 324/366 |
| 4,122,387 | 10/1978 | Ajam et al. | 364/422 X |
| 4,340,934 | 7/1982 | Segesman | 364/422 |
| 4,361,808 | 11/1982 | Kern et al. | 324/366 |
| 4,412,180 | 10/1983 | Desbrandes | 324/373 |
| 4,472,307 | 9/1984 | Bravenec | 324/373 |
| 4,535,625 | 8/1985 | Lyle, Jr. | 364/422 X |

FOREIGN PATENT DOCUMENTS

7202540  9/1972  Netherlands ..................... 324/373

OTHER PUBLICATIONS

Runge et al, "Ultra-Long Spaced Electric Log (UL-SEL)", *The Log Analyst*, Sep.–Oct. 1969, pp. 20–30.

*Primary Examiner*—Reinhard J. Eisenzopf
*Assistant Examiner*—Warren S. Edmonds
*Attorney, Agent, or Firm*—S. R. LaPaglia; E. J. Keeling; H. D. Messner

[57] ABSTRACT

The response characteristics of a combination of hole-centered electric logging tools in a variety of borehole conditions can be obtained by means of impedance values as entries of a matrix resulting from measurements over a series of depth increments, utilizing an array of M electrode assemblies of equal incremental spacing positioned on a rigid mandrel. While the array is substantially stationary within the borehole, currents from each electrode are emitted independently, one at a time, allowing the impedance matrix to be formed by the principle of linear superposition in terms of voltage and voltage difference measurements between adjacent electrodes.

17 Claims, 7 Drawing Figures

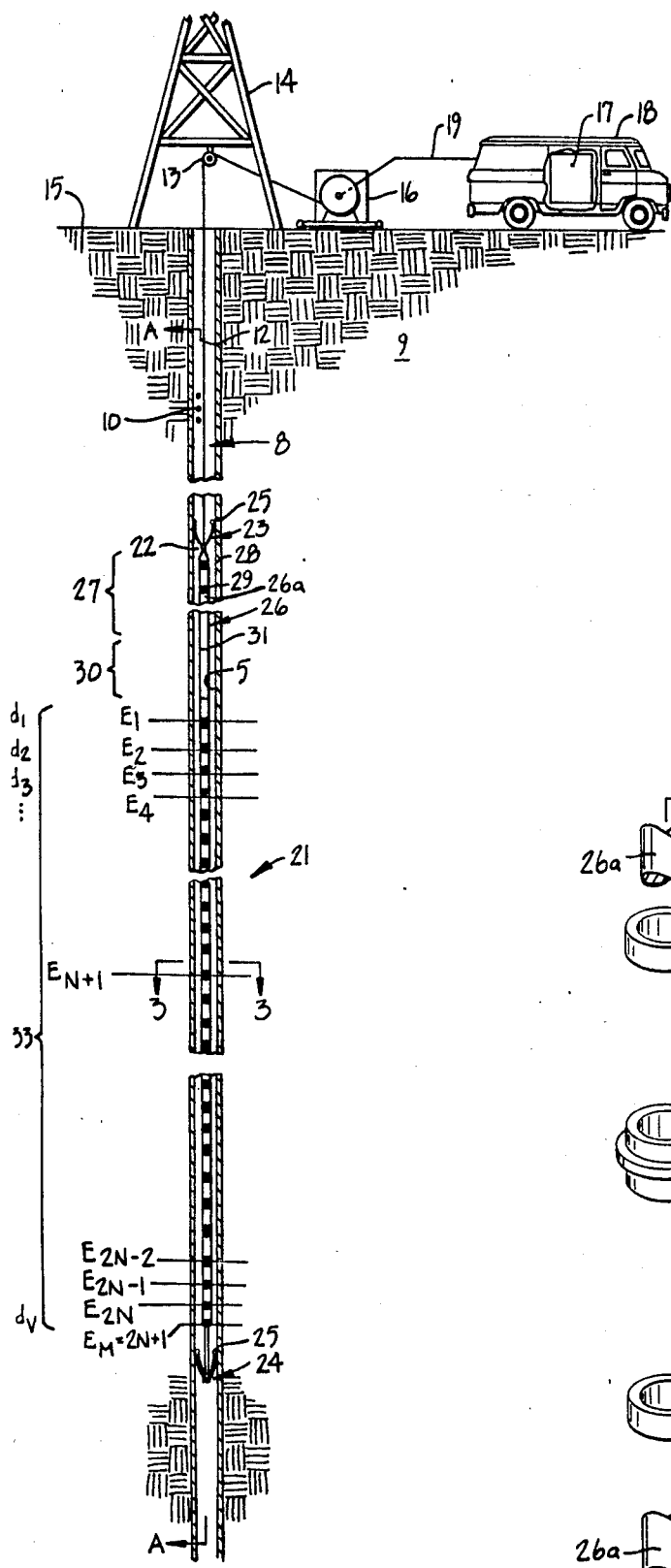
FIG._1.
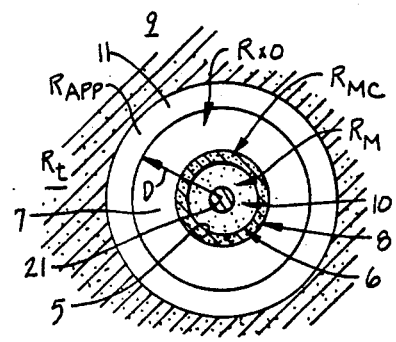
FIG._3.
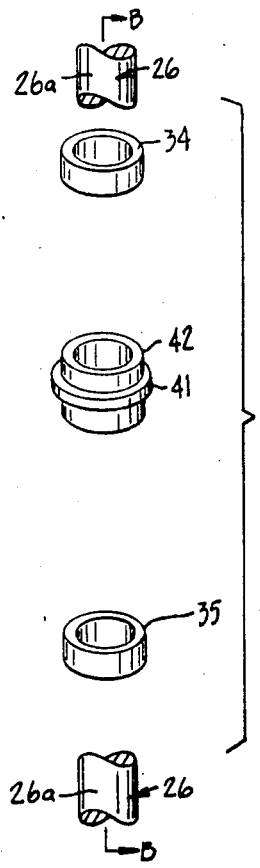
FIG._2.

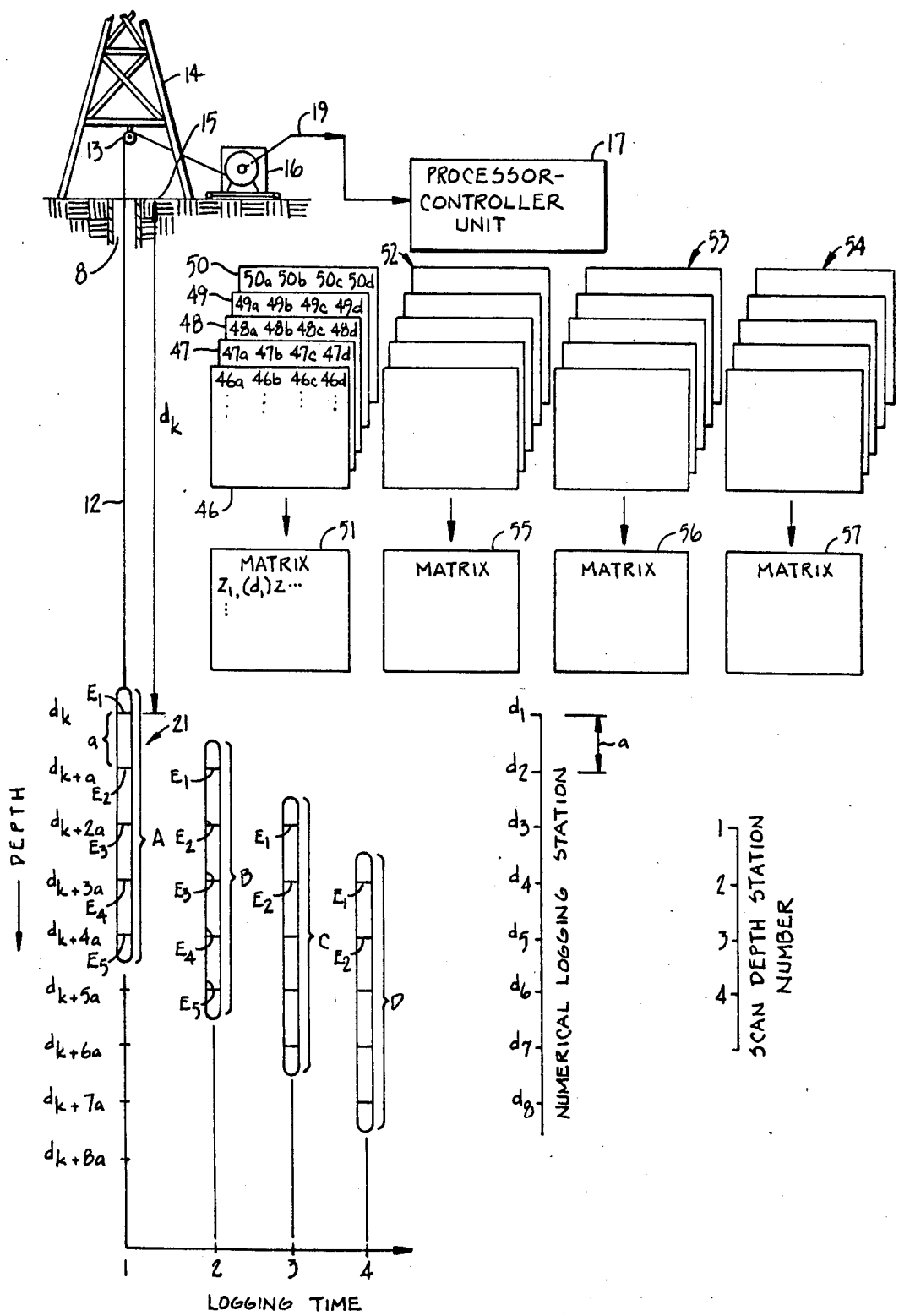
FIG._4.

51

|    | $c_1$ | $c_2$ | $c_3$ | $c_4$ | $c_5$ |
|----|-------|-------|-------|-------|-------|
| $R_1$ | $z_{1,1}(d_k)$ | $z_{1,2}(d_{k+a})$ | $z_{1,3}(d_{k+2a})$ | $z_{1,4}(d_{k+3a})$ | $z_{1,5}(d_{k+4a})$ |
| $R_2$ | $\Delta z_{2,1}(d_k)$ | $\Delta z_{2,2}(d_{k+a})$ | $\Delta z_{2,3}(d_{k+2a})$ | $\Delta z_{2,4}(d_{k+3a})$ | $\Delta z_{2,5}(d_{k+4a})$ |
| $R_3$ | $\Delta z_{3,1}(d_k)$ | $\Delta z_{3,2}(d_{k+a})$ | $\Delta z_{3,3}(d_{k+2a})$ | $\Delta z_{3,4}(d_{k+3a})$ | $\Delta z_{3,5}(d_{k+4a})$ |
| $R_4$ | $\Delta z_{4,1}(d_k)$ | $\Delta z_{4,2}(d_{k+a})$ | $\Delta z_{4,3}(d_{k+2a})$ | $\Delta z_{4,4}(d_{k+3a})$ | $\Delta z_{4,5}(d_{k+4a})$ |
| $R_5$ | $\Delta z_{5,1}(d_k)$ | $\Delta z_{5,2}(d_{k+a})$ | $\Delta z_{5,3}(d_{k+2a})$ | $\Delta z_{5,4}(d_{k+3a})$ | $\Delta z_{5,5}(d_{k+4a})$ |

$$= \underline{\Delta Z_3}\,[d_k - (d_{k+4a})]\,[d_{k+2a},\, Sd_1]$$

55

|    | $c_1$ | $c_2$ | $c_3$ | $c_4$ | $c_5$ |
|----|-------|-------|-------|-------|-------|
| $R_1$ | $z_{1,1}(d_{k+a})$ | $z_{1,2}(d_{k+2a})$ | $z_{1,3}(d_{k+3a})$ | $z_{1,4}(d_{k+4a})$ | $z_{1,5}(d_{k+5a})$ |
| $R_2$ | $\Delta z_{2,1}(d_{k+a})$ | $\Delta z_{2,2}(d_{k+2a})$ | $\Delta z_{2,3}(d_{k+3a})$ | $\Delta z_{2,4}(d_{k+4a})$ | $\Delta z_{2,5}(d_{k+5a})$ |
| $R_3$ | $\Delta z_{3,1}(d_{k+a})$ | $\Delta z_{3,2}(d_{k+2a})$ | $\Delta z_{3,3}(d_{k+3a})$ | $\Delta z_{3,4}(d_{k+4a})$ | $\Delta z_{3,5}(d_{k+5a})$ |
| $R_4$ | $\Delta z_{4,1}(d_{k+a})$ | $\Delta z_{4,2}(d_{k+2a})$ | $\Delta z_{4,3}(d_{k+3a})$ | $\Delta z_{4,4}(d_{k+4a})$ | $\Delta z_{4,5}(d_{k+5a})$ |
| $R_5$ | $\Delta z_{5,1}(d_{k+a})$ | $\Delta z_{5,2}(d_{k+2a})$ | $\Delta z_{5,3}(d_{k+3a})$ | $\Delta z_{5,4}(d_{k+4a})$ | $\Delta z_{5,5}(d_{k+5a})$ |

$$= \underline{\Delta Z_4}\,[(d_{k+a}) - (d_{k+5a})]\,[d_{k+3a},\, Sd_2]$$

56

|    | $c_1$ | $c_2$ | $c_3$ | $c_4$ | $c_5$ |
|----|-------|-------|-------|-------|-------|
| $R_1$ | $z_{1,1}(d_{k+2a})$ | $z_{1,2}(d_{k+3a})$ | $z_{1,3}(d_{k+4a})$ | $z_{1,4}(d_{k+5a})$ | $z_{1,5}(d_{k+6a})$ |
| $R_2$ | $\Delta z_{2,1}(d_{k+2a})$ | $\Delta z_{2,2}(d_{k+3a})$ | $\Delta z_{2,3}(d_{k+4a})$ | $\Delta z_{2,4}(d_{k+5a})$ | $\Delta z_{2,5}(d_{k+6a})$ |
| $R_3$ | $\Delta z_{3,1}(d_{k+2a})$ | $\Delta z_{3,2}(d_{k+3a})$ | $\Delta z_{3,3}(d_{k+4a})$ | $\Delta z_{3,4}(d_{k+5a})$ | $\Delta z_{3,5}(d_{k+6a})$ |
| $R_4$ | $\Delta z_{4,1}(d_{k+2a})$ | $\Delta z_{4,2}(d_{k+3a})$ | $\Delta z_{4,3}(d_{k+4a})$ | $\Delta z_{4,4}(d_{k+5a})$ | $\Delta z_{4,5}(d_{k+6a})$ |
| $R_5$ | $\Delta z_{5,1}(d_{k+2a})$ | $\Delta z_{5,2}(d_{k+3a})$ | $\Delta z_{5,3}(d_{k+4a})$ | $\Delta z_{5,4}(d_{k+5a})$ | $\Delta z_{5,5}(d_{k+6a})$ |

$$= \underline{\Delta Z_5}\,[(d_{k+2a}) - (d_{k+6a})]\,[d_{k+4a},\, Sd_3]$$

57

|    | $c_1$ | $c_2$ | $c_3$ | $c_4$ | $c_5$ |
|----|-------|-------|-------|-------|-------|
| $R_1$ | $z_{1,1}(d_{k+3a})$ | $z_{1,2}(d_{k+4a})$ | $z_{1,3}(d_{k+5a})$ | $z_{1,4}(d_{k+6a})$ | $z_{1,5}(d_{k+7a})$ |
| $R_2$ | $\Delta z_{2,1}(d_{k+3a})$ | $\Delta z_{2,2}(d_{k+4a})$ | $\Delta z_{2,3}(d_{k+5a})$ | $\Delta z_{2,4}(d_{k+6a})$ | $\Delta z_{2,5}(d_{k+7a})$ |
| $R_3$ | $\Delta z_{3,1}(d_{k+3a})$ | $\Delta z_{3,2}(d_{k+4a})$ | $\Delta z_{3,3}(d_{k+5a})$ | $\Delta z_{3,4}(d_{k+6a})$ | $\Delta z_{3,5}(d_{k+7a})$ |
| $R_4$ | $\Delta z_{4,1}(d_{k+3a})$ | $\Delta z_{4,2}(d_{k+4a})$ | $\Delta z_{4,3}(d_{k+5a})$ | $\Delta z_{4,4}(d_{k+6a})$ | $\Delta z_{4,5}(d_{k+7a})$ |
| $R_5$ | $\Delta z_{5,1}(d_{k+3a})$ | $\Delta z_{5,2}(d_{k+4a})$ | $\Delta z_{5,3}(d_{k+5a})$ | $\Delta z_{5,4}(d_{k+6a})$ | $\Delta z_{5,5}(d_{k+7a})$ |

$$= \underline{\Delta Z_6}\,[(d_{k+3a}) - (d_{k+7a})]\,[d_{k+5a},\, Sd_4]$$

FIG.—5.

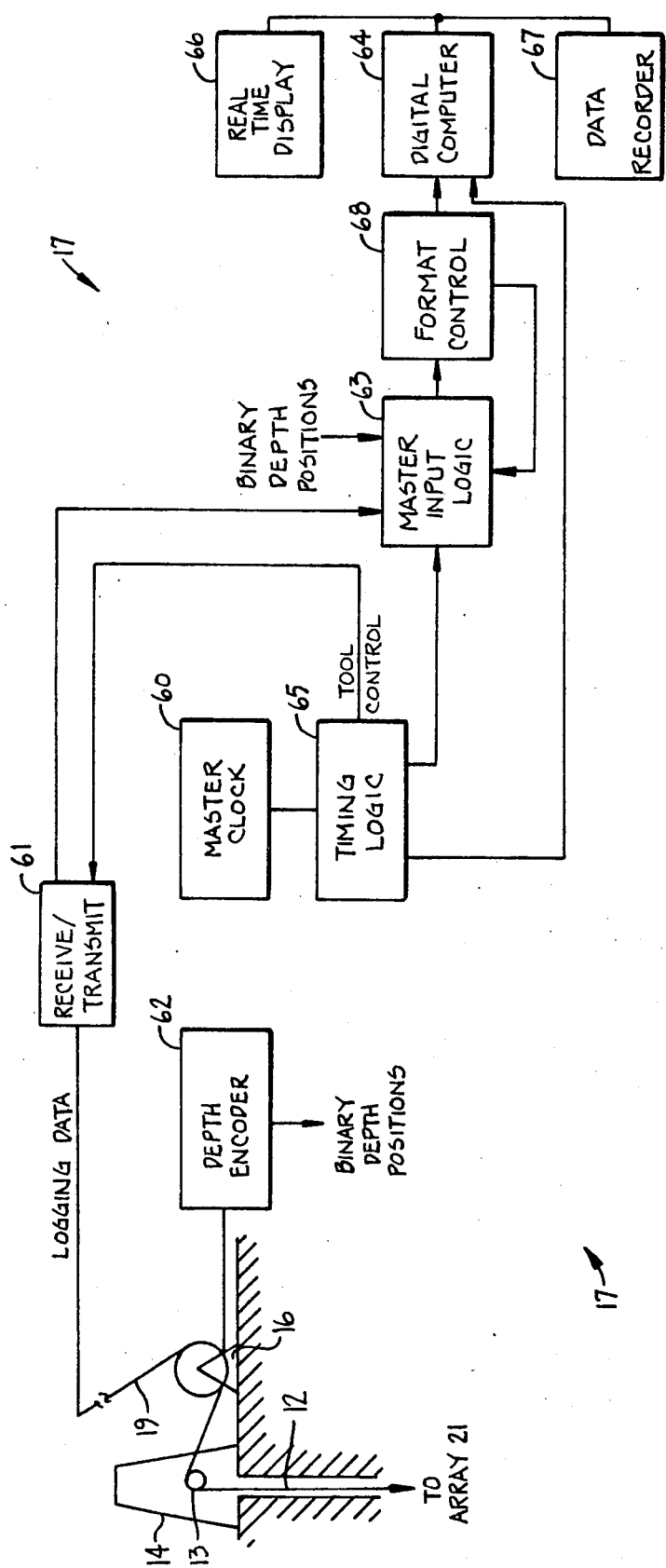
FIG._6.

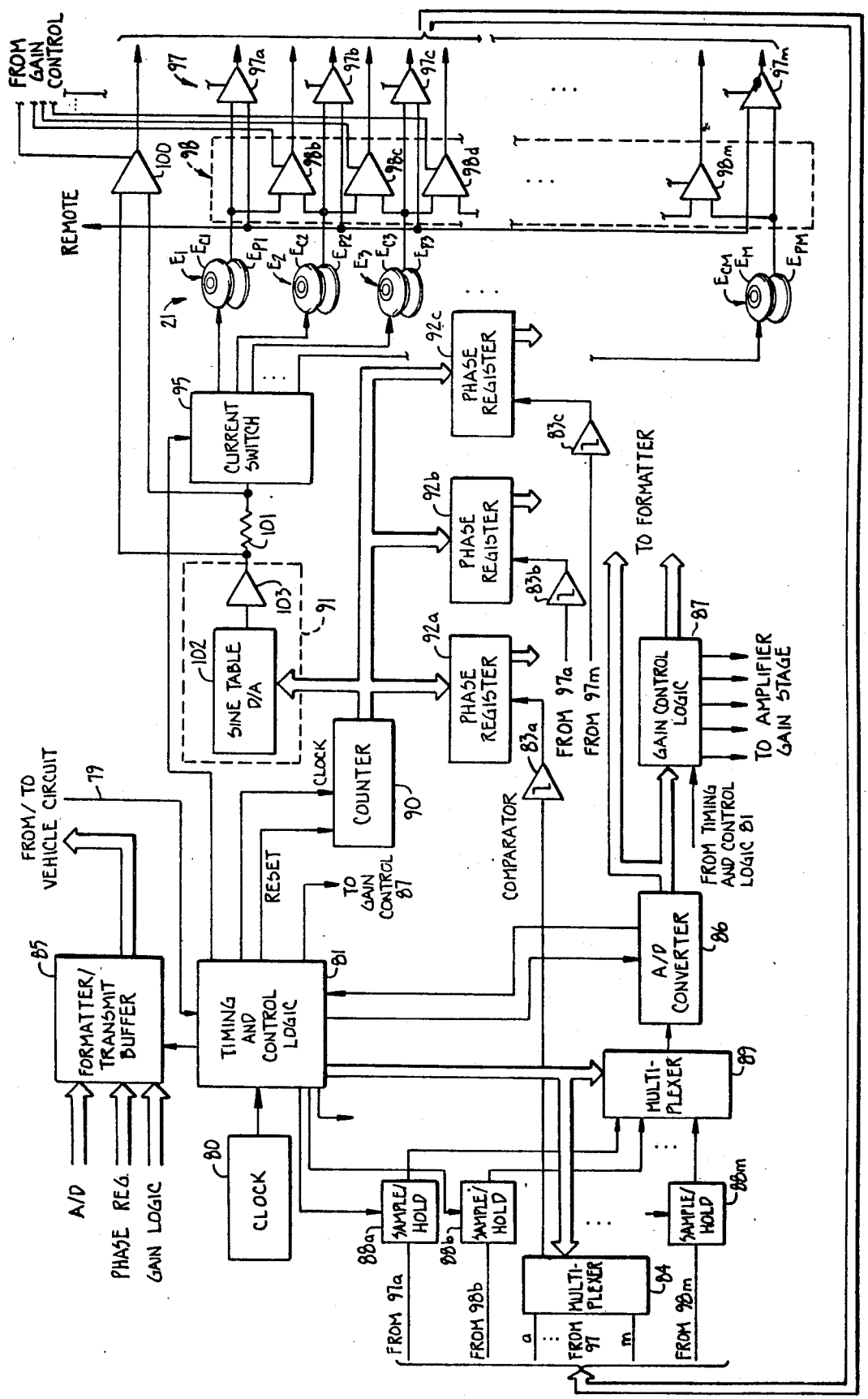
FIG._7.

METHOD OF LOGGING AN EARTH FORMATION PENETRATED BY A BOREHOLE TO PROVIDE AN IMPROVED ESTIMATE OF IMPEDANCE DISTRIBUTION OF THE FORMATION

RELATED APPLICATIONS

Our applications filed concurrent with and related to the subject application and incorporated herein by reference, include the following:

| TITLE | Ser. No. | FILING DATE |
| --- | --- | --- |
| METHOD OF INTERPRETING IMPEDANCE DISTRIBUTION OF AN EARTH FORMATION USING PRECURSOR LOGGING DATA PROVIDED BY A MULTI-ELECTRODE LOGGING ARRAY STATIONARY WITHIN A BOREHOLE; | 761,123 | July 31, 1985 |
| METHOD OF LOGGING AN EARTH FORMATION PENETRATED BY A BOREHOLE TO PROVIDE AN IMPROVED ESTIMATE OF IMPEDANCE DISTRIBUTION WITH DEPTH USING A SINGLE CONTINUOUSLY EMITTING CURRENT ELECTRODE AND A MULTIPLICITY OF POTENTIAL ELECTRODES OF A MOVING LOGGING ARRAY; | 761,126 | July 31, 1985 |
| METHOD OF INTERPRETING IMPEDANCE DISTRIBUTION OF AN EARTH FORMATION PENETRATED BY A BOREHOLE USING PRECURSOR DATA PROVIDED BY A MOVING LOGGING ARRAY HAVING A SINGLE CONTINUOUSLY EMITTING CURRENT ELECTRODE AND A MULTIPLICITY OF POTENTIAL ELECTRODES; | 761,127 | July 31, 1985 |
| METHOD OF LOGGING AN EARTH FORMATION PENETRATED BY A BOREHOLE TO PROVIDE AN IMPROVED ESTIMATE OF IMPEDANCE DISTRIBUTION WITH DEPTH USING END EMITTING CURRENT ELECTRODES SEQUENTIALLY ACTIVATED AND A MULTIPLICITY OF POTENTIAL ELECTRODES OF A MOVING LOGGING ARRAY; | 761,124 | July 31, 1985 |
| METHOD OF INTERPRETING IMPEDANCE DISTRIBUTION OF AN EARTH FORMATION OBTAINED BY A MOVING ARRAY USING END EMITTING CURRENT ELECTRODES SEQUENTIALLY ACTIVATED AND A SERIES OF POTENTIAL ELECTRODES | 761,125 | July 31, 1985 |

SCOPE OF THE INVENTION

This invention relates to downhole electrical logging methods and apparatus for carrying out same, and more particularly to a multi-electrode electrical logging method of high efficiency and improved resolution for systematically providing an improved estimate of the impedance distribution of an earth formation with depth wherein precursor voltage and current values can be measured using a stationary logging array and drive currents sequentially emitted from each electrode assembly of the array. In one aspect of the invention, processing of the field data is for the purpose of providing a surprisingly accurate impedance matrix of the earth formation indexed to a series of predetermined, but overlapping depth scan increments from which the true resistivity (Rt) of the formation can be determined. Each depth scan segment is indexed to shallow and deep depth markers that define its zone of resolution centered at a depth coincident with the mid-central electrode assembly at the time that the precursor values were collected. Any individual impedance entry associated with a given depth location is determined based on actual measurements without reliance upon the principle of reciprocity of result. Additional constraints based on the concept of superposition can be placed on the matrix data to simulate lateral and vertical changes in formation resistivity akin to that provided by any number of modern focused tool arrays.

BACKGROUND OF THE INVENTION

From a knowledge of the voltage distribution in earth formation penetrated by a borehole resulting from imposed current flow in the formation, hydrocarbon saturation of the formation can be determinded. Rock matrices are generally nonconductors of electricity. But if the formation is porous and contains fluids, current can be driven through the formation, and the voltage distribution along the borehole measured. The impedance of the formation relates to its ability to impede the flow of current through the formation, and is measured in ohms.

The resistivity of the formation also relates to the ability of the former to impede current flow but is measured not in ohms but in terms of ohm meter$^2$ per meter or ohm-meter. That is to say, the resistivity of a formation is the impedance (in ohms) of a one meter by one meter by one meter cube of the formation when the current flows between opposite faces of the cube. Resistivities fall in the range from 0.2 to 1000 ohm-meter in most permeable earth formations we are familiar with.

Since the formation to be logged is penetrated by a borehole containing a fluid having a resistivity other than that of the adjacent formation, the obtained apparent resistivitv (Ra) can differ from the true resistivity (Rt) of the formation. That is to say, the presence of the borehole filled with a fluid having a resistivity Rm different from that of the formation; the fact that the drilling fluid filtrate invades the formation to a limited degree and flushes away formation water and some hydrocarbons to establish a resistivity Rxo again different from that of the formation; and the fact that the measuring electrodes may cross into adjacent formations, all perturb the final results.

Certain electrical logging methods overcome such perturbations because of novel borehole conditions. For example, conventional resistivity logs (non-focused logs), provided by conventional electrical survey (ES) tools, provide good true resistivity estimates only in thick homogeneous beds having porosities greater than 15 percent. For thinner bed conditions, such tools can provide reliable results if filtrate invasion is shallow, if the true resistivity is low to moderate and if the resistivity of flushed zone is equal to or less than the true resistivity to be measured.

Additional more advanced logs have been developed to concentrate on enhancing the focusing properties of the electrical tools to overcome the above-mentioned perturbations. For example, families of resistivity tools have been developed in the last quarter century which use focusing currents to control the paths taken by the measuring current: among such tools, are the focusing logging tools including the spherically focused tool. Such tools use currents supplied to special electrodes on the tool and their readings are less affected by borehole conditions and the presence of adjacent beds.

But to an essential degree both types of logs have not been flexible enough under the varying borehole conditions encountered in today's production fields, on land or at sea. For example, conventional ES logs are too broadly structured to provide a way for a user to determine focusing response of electrical tools independent of electrode arrangement. Conversely, focused electrical logs are too strictly formulated to provide such independent results. That is, insufficient measurements are provided to yield results of focusing characteristics beyond that of the original configuration. In addition, calibration factors for deep and shallow focused tools appear to be chosen so that their responses are equal to the true formation resistivity in uninvaded formations having formation/mud resistivity contrasts in a range of 10/1 to 100/1 normalized to an eight-inch borehole. Hence in order for the user to have the option to test different focusing responses independent of electrode arrangement, he had to develop an entirely different logging method.

One such proposal is set forth in U.S. Pat. No. 3,076,138 for "Electrical Logging", R. B. Stelzer, in which a multiple electrode array tool is used to provide voltage and current measurements that can be arranged in matrix format within a digital computer, as a function of depth along the borehole.

In the patent, the genesis of the matrix format is described in terms of a 2×3 array divided into six submatrices, one of which is a square array whose entries are surprisingly found to be independent of any later electrode arrangement to be synthesized. The above-mentioned square submatrix has rows which can be filled with raw field data values, e.g., to identify the voltage at a common depth position and columns of values that can identify voltage response at a series of voltage electrodes (including the current emitting electrode), as a function of common current electrode location.

It is believed that this proposal is the first to recognize that electrode logging data (viz., current, resistance and voltage) could be combined in such a matrix format.

In field operations, a bottom mounted current electrode is continuously energized as the sonde is moved through the borehole. Absolute voltage measurements at each of the series of uphole pickup electrodes (including the current emitting electrode) are sensed and recorded with respect to a remote uphole voltage reference electrode. A return current electrode is also mounted on the bridle of the tool, suitably located from the other electrodes, and the current from the emitting electrode is also measured and recorded. By dividing the measured absolute voltages by the corresponding measured current in accordance with Ohm's Law in matrix format, a resistance matrix R between arbitrary synthetic voltage and current values can be established. (Henceforth, matrix quantities will be underscored.) In principle, such a resistance matrix is suitable for synthesizing substantially the responses of conventional electric logging tools by manipulation of the matrix elements. Such operations, as explained in more detail below, are most important in the effectuation of the scheme in accordance with the proposal because of its basic property of allowing the synthetic currents to be uniquely determined from the corresponding voltages, or vice versa.

Also of importance in the practical implementation of the proposal is the recognition that it will generally be necessary to solve systems of equations involving the aforementioned submatrix, or what is equivalent to accurately computing the mathematical inverse of the submatrix to simulate responses of modern focused tools. That is to say, the solution of the reciprocal of such submatrix will be generally necessary for the synthesis of modern focused tools and especially for the synthesis of new and heretofore unknown electrode combinations requiring arbitrary voltage-current relationships. Thus, the above proposal is applicable only to those situations for which it is possible to produce the inverse of the submatrix with sufficient accuracy. But experience has indicated that in many field applications such results are not possible. The problem has to do with the numerical constraints imposed by the measurement process which ultimately result in finite limited precision of the voltage measurements, and has appeared with regularity in those field situations for which the formation to mud resistivity contrast is greater than 100 to 1 (viz., in situations where salty drilling fluids are used; where the uninvaded formation is of low porosity; and where there is moderate to high hydrocarbon saturation). It is believed the failure of the proposal to provide accurate results, has to do with the fact that in such high contrasts, the potential tends to change very slowly from electrode to electrode. Thus, it has been impossible to preserve the required precision to accurately resolve the gradual variation involved. As a consequence, in subsequently manipulating matrix potential values, such as where floating point calculations specify differences in the potential between adjacent electrodes, the method of the proposal breaks down.

More recently, a second proposal has been put forth in U.S. Pat. No. 4,087,741 for "Downhole Geoelectric Remote Sensing Method", I. R. Mufti, in which a multiple electrode array tool is described for the detection of lateral resistive anomalies remote from the borehole. Typically, such anomalies are salt domes. This system uses the superposition principle to achieve synthesis of various four (4) electrode tools in the manner of extremely ultra long spaced electric logging tools (ULSEL)—see R. J. RUNGE ET AL, "Ultra-long Spaced Electric Log (ULSEL)", THE LOG ANALYST, Vol. 10, No. 5, September-October, 1969.

More specifically in this proposal, a center mounted current electrode array (viz., a current electrode with voltage sensing electrodes disposed symmetrically above and below the current electrode) is disposed on a bridle of ultra-long length. The current electrode is continuously energized at a low frequency as the bridle is moved through the borehole. Voltage differences between adjacent sensing electrodes above and below the current electrode are measured and recorded. The exclusive purpose of the tool: to synthesize various long-range, four-electrode tools for the detection of lateral anomalies. Since the voltage sensing electrodes are nonuniformly spaced, and since quantities related to the driving point resistance (i.e., the driving point impedance at the current emitting electrodes) are not measured, the proposal does not result in the type of matrix formulation provided by either the first-mentioned proposal or that provided by the present invention. That is to say, while the second proposal will allow calculations of potentials at given electrodes in presence of certain arbitrary currents at other electrodes, it will not allow the inverse calculations, i.e., the calculation of current at a given electrode position for given potentials at other electrode positions via a measured impedance matrix. It therefore cannot be used either in principle or in practice to synthesize other types of logging tools of interest in general.

SUMMARY OF THE INVENTION

In synthesizing the true response characteristics of a combination of different hole-centered electric logging tools in a variety of difficult borehole conditions as provided by (1) determining impedance values of an earth formation penetrated by a borehole filled with a drilling mud of resistivity (Rm), and (2) selectively manipulating the impedance values as impedance entries of a matrix so as to synthesize operations of different hole-centered tools over an associated depth increment with surprising accuracy, a method of providing said impedance entries for a series of matrix gathers, each gather being indexed to one of a series of finite, overlapping depth scan increments of the formation measured along the borehole, each scan increment being dependent on the array length L of the electrode array to define shallow and deep depth markers as well as being centrally indexed to the depth in the borehole of a mid-central electrode assembly of the array at the time of data collection, and thereby provide a true indication of the formation resistivity (Rt) even though the formation is interspaced from the borehole by an invaded zone of resistivity (Rxo) of unknown lateral extent due to drilling mud filtrate invasion, so that synthesization can occur irrespective of which set of potential or current values are later used as response initiators, comprising:

(i) rigidly attaching an array of M electrode assemblies of equal incremental electrode spacing "a" positioned on a hole-centered mandrel, to a lodging cable in which each electrode assembly comprises a current and a potential electrode and has an established internal indexing number;

(ii) positioning the array in the borehole wherein the absolute depth of at least one assembly is continuously known with respect to the earth's surface;

(iii) while the array is substantially stationary within the borehole, injecting current from each of said electrode assemblies—one at a time—into the adjacent formation;

(iv) at each occurrence of current injection, measuring the absolute potential at a common electrode assembly and the potential differences between adjacent pairs of assemblies as a function of internal indexing numbers of active current and potential sensing electrodes of the assemblies used in the measurements;

(v) advancing the array along the borehole an increment distance equal to the electrode assembly spacing "a" between adjacent assemblies and repeating steps (iii) and (iv), again with the array being substantially stationary within the borehole:

(vi) re-repeating steps (iii)–(v) until the collection of all current and potential data has been completed;

(vii) calculating impedance values from the measured absolute and difference potential values and their associated injected current, each value being indexed to said known internal indexing numbers of active current and potential electrodes used in the measurements;

(viii) reindexing the impedance values into impedance entries of a series of overlapping matrix gathers, each gather being associated with a predetermined zone of said formation coincident with the depth of the mid-central assembly as the steps (iii) and (iv) occur, and comprising $M \times M$ impedance entries where M is the largest internal indexing number of the array and in which the ratio of the number of difference impedance entries to absolute entries is about M-1:1 whereby each $M \times M$ matrix gather is surprisingly useful in deducing true resistivity of the formation even in the presence of high true resistivity to mud resistivity contrasts and irrespective of whether or not synthetic sets of potential or sets of current values are later used as initiators of subsequently generated responses of computer focused synthetic tool arrays.

As a consequence of measuring not only the absolute potentials during collection but also the difference in potentials between adjacent electrode assemblies of the array, the consequences of subsequent manipulation of the matrix gather is greatly enhanced. That is, when properly assembled in matrix gather format, the impedance entries of each gather essentially preserve the one-to-one relationship between any synthetic combination of voltages and/or currents associated with focused tool arrays irrespective of which is used as the response initiators, and even though the precursor current and potential values have been collected in the presence of high formation to mud resistivity contrasts.

DESCRIPTION OF DRAWINGS

FIG. 1 is a partial side elevation of an earth formatation penetrated by a borehole containing an electrical logging array of the present invention for illustrating a method for estimating the impedance distribution of the earth formation lateral to the borehole including a form of the invention in which the logging array is stationary in the borehole as current and potential measurements are generated at a series of logging stations indexed to depth positions denoting fixed depths in units of electrode spacing before moving down (or up) the borehole to the next adjacent logging station and repeating the collection cycle;

FIG. 2 is a detail of a typical electrode assembly of FIG. 1 illustrating constructional details of the current and potential electrodes comprising that assembly;

FIG. 3 is a section taken along the line 3—3 of FIG. 1 illustrating how detected measurements provided by the array can be used to deduce the resistivity characteristics of the formation as a function of offset distance even though the formation has undergone invasion by the drilling mud;

FIG. 4 is a schematic representation of the method of the present invention for systematically indicating the impedance distribution of the adjacent earth formation using a modified 5-electrode assembly array in which the indexing features of the displays are detailed;

FIG. 5 is an enlarged detail of the final displays of FIG. 4;

FIGS. 6 and 7 are schematic representations of uphole and downhole circuit elements for carrying out the method of the present invention.

DESCRIPTION OF A PREFERRED EMBODIMENT OF THE INVENTION

In the description that follows like elements are marked throughout the Specification and Drawings with the same reference numerals. The drawings are not to scale and certain features of the invention may be exaggerated in scale or operation in the interest of clarity or conciseness.

Referring to FIG. 1, a borehole 8 is shown penetrating a subsurface formation 9. Assume the borehole 8 contains a drilling mud 10. Purpose of the drilling mud 10: to carry chips away from the drill bit during drilling of the borehole 8 as well as to prevent collapse of the borehole 8 as during drilling and production operations. Also suspended within the borehole 8 is a conductor cable 12 of conventional construction, i.e., multiple strands of flexible steel interlaced with a plurality of electrical conductors. The cable 12 is suspended within borehole 8 via pulley 13 attached to derrick 14 at the earth's surface 15 and thence to hoisting unit 16. Purpose of hoisting unit 16: to reel in or play out cable 12 within the borehole 8.

At the earth's surface 15, signals on the electrical conductors of the cable 12 pass through a slip ring assembly (not shown) on the hoisting unit 16 and thence to a controller-processor circuit 17 within van 18, as via conductor 19. Downhole, such signals originate at and are a function of the operational characteristics of electric logging array 21 of the present invention.

ELECTRIC LOGGING ARRAY 21

Downhole, the cable 12 is attached to logging array 21 via a threaded plug 22. Above the plug 22 is an uphole centralizer 23. Below the array 21 is downhole centralizer 24. The centralizers 23 and 24 are similar in construction and each includes a series of spring loaded arms 25 which are biased radially outward into contact with sidewall 5 of the borehole 8. The arrangement of the centralizers 23 and 24 is similar to centralizers used in various types of logging and inspection tools and is for the purpose of locating the logging array 21 coincident with the axis of symmetry A-A of the borehole 8.

Logging array 21 is cylindrical in construction having a support structure defined by a mandrel 26. The mandrel 26 has an outer surface 26a. At the surface 26a are a series of electrode assemblies having an internal numbering index $E_{1I}, E_2 \ldots E_{N+1} \ldots E_M$. In order that the adjacent assemblies be electrically isolated one from the other, an insulating material is fitted between each electrical assembly $E_1, E_2 \ldots E_M$ and the outer surface 26a of mandrel 26. The array 21 is divided into three sections: (i) Uphole section 27 within which reside return current electrode 28 and reference potential electrode 29, the purpose of such electrodes 28 and 29 being to complete the current loop and to normalize potential measurements, respectively, as conventional in the electric logging art. If desired, the metallic strands of the cable 12 may also be used as the reference electrode as well as the return current electrode, as is also conventional in that art; (ii) Mid section 30 that contains threads 31 at its upper end for engagement with uphole section 27. Interior of midsection 30 are a series of slave control and measuring elements to be described in detail hereinafter, under control of master circuitry of controller-processor unit 17 at the earth's surface 15; and (iii) Downhole section 33 on which reside the series of electrode assemblies $E_1, E_2 \ldots E_M$, previously mentioned.

FIG. 2 shows the construction of a typical electrode assembly $E_1, E_2 \ldots$ or $E_M$ in more detail.

As shown, each such assembly includes a current electrode member 34 and a potential sensing electrode 35, both of annular construction that fit the two ends of insulating member 42. Between the members 34 and 35 is an insulating lip 41, which is part of member 42 and serves to keep electrodes 34 and 35 from being in physical contact with one another. Members 34, 35 and 42 are located about outer surface 26a of mandrel 26 concentric of the axis of symmetry B-B.

Note when members 35 and 34 are attached in the manner depicted in FIG. 1 so as to function as current and potential electrodes, respectively, that they have widths in the vertical direction that are small compared to the axial spacing "a" between electrode assemblies $E_1, E_2 \ldots E_M$ and, in addition, they are so closely nested relative to each other (that is, the thickness of the lip 41 of FIG. 2 is also quite small compared to the axial spacing "a") that for purposes of axial resolution, their axial position is equivalent to a single fixed depth station $d_1, d_2, d_3, \ldots d_v$ in FIG. 1.

With regard to the internal numbering order of the electrode assemblies, note that the shallowest assembly is assembly $E_1$ and the deepest assembly is $E_M$ and that the depth of any electrode assembly $E_1, E_2 \ldots E_M$ can be determined based on $$\text{Depth} = d_k + (p-1)a.$$

where p is 1,2 ... M; $d_k$ is the absolute depth of the shallowest electrode assembly of the array; and M is the deepest electrode assembly of the array.

OPERATIONS

Briefly, in accordance with the present invention, the purpose of logging array 21 is to provide an impedance distribution of the formation 9 such that such values preserve a one-to-one relationship between any subsequent combination of voltages and currents that could possibly be used to synthesize the response characteristics from any number of different electrical tools under a variety of difficult and different borehole and formation conditions. To achieve such a goal, the logging array 21 is operated in the manner depicted in FIG. 1 so that current and potential values are systematically collected as function of depth. Next, controller-processor circuit 17 at the earth's surface 15, selectively manipulates such values to form entries of a series of matrix qathers, each gather being exceedingly useful in synthesizing operations of different logging tools within the borehole 8 penetrating the formation 9. Ultimate purpose: to provide a true indication of characteristics of formation 9 even though that formation may have been invaded by drilling mud filtrate in and around the borehole to an unknown extent as in the manner of FIG. 3, whether or not synthetic sets of potential or current vectors are later used as initiators of the simulated computer focused tool arrays.

That is to say, as shown in FIG. 3 note that the borehole 8 to be logged via logging array 21 can contain drilling mud 10 of resistivity Rm; that the drilling mud 10 can build up a mud cake 6 at the sidewall 5 of the borehole 8; and that the mud filtrate can invade the formation 9 a distance D from the center line of the borehole 8 thereby creating different resistivity levels in and around the borehole 8, viz., a mud cake zone of resistivity Rmc; a flushed zone 7 of resistivity Rxo, and a transition zone 11 of resisitivity that may vary between the resisitivity of the flushed zone and of the formation 9, viz., between Rxo and Rt and for purposes of discussion is called Rapp. In order to indicate the lateral resistivity changes vis-a-vis the drilling mud 10, the flushed zone 7, and the formation 9, not only must the logged current and potential values as provided by logging array 21 (as a function of depth) be systematically collected and indexed, but the impedance values calculated from these values must also be accurately indexed so that afterward, viz., say after logging has been completed, they can be selectively manipulated to provide different degrees of lateral resolution irrespective of whether or not the response initiators for such manipulations, are artificial sets of current or potential values. In that way, the lateral resistivity changes mentioned above can be easily determined.

During collection of data in accordance with FIG. 1, the logging array 21 remains stationary as the current electrode of each assembly $E_1, E_2 \ldots E_M$ is sequentially activated. Current injection typically begins with assembly $E_1$ and proceeds in ordered sequences through the remaining assemblies $E_2, E_3$, etc., and ends with assembly $E_M$. Potential measurements occur at all the electrode assemblies $E_1, E_2 \ldots E_M$ in a similar sequential pattern beginning initially at assembly $E_1$ and proceeding downward to assembly $E_M$. Next, the logging array 21 is rolled up or down the borehole one logging station, say where assembly $E_1$ is rolled down from station $d_1$ to station $d_2$, and the collection process is repeated. Result: a series of current and potential values are systematically collected as a function of depth for later manipulation as set forth below. But note that current and potential values to be manipulated only have formation integrity if they all relate to the same stationary collection local. That is to say, values must be indexed to a particular stationary depth scan interval (equal to M logging stations) that prevents intertwining of like values of different depth scan intervals, in a manner explained in more detail below.

FIG. 4 illustrates how systematic collection and indexing occurs during operations. For description purposes, it is assumed that the number of electrode assemblies comprising the logging array 21 has been greatly curtailed, say scaled down from the large array of FIG. 1 to a 5-electrode array comprising electrode assemblies $E_1, E_2 \ldots E_5$, and the 5-electrode array 21 is sequentially rolled down only a selected number of logging stations. That is, only four separate collection cycles, viz., cycles 1, 2 ... 4 for logging positions A, B, C, and D will be described in detail. But at each logging position there will be generated sufficient precursor current and potential values to form a 5×5 matrix gather and it is from that standpoint that the 5×5 gather matrices of the present invention are presented. In associating the measured potential and current values into 5×5 gather matrices, it will become evident that potential values collected above the current electrode will provide matrix entries above its diagonal, while those collected below will give entries below its diagonal. In this regard, the ordinate of the plot in FIG. 4 is in units of depth and the abscissa is in units of incremental time or cycles 1, 2 ... 4. Spacing between the assemblies $E_1 \ldots E_5$ is equal to spacing factor "a", as is the distance between logging stations $d_1, d_2 \ldots d_8$ At each logging position A, B, C, and D, note that the array 21 is stationary during collection of the potential, phase and current values. Thereafter, the array is rolled downward to the next logging position and the collection process is repeated. Movement of the array 21 occurs because of reeling out of cable 12 via hoisting unit 16. The collected values are transmitted uphole via the cable 12 and at the earth's surface 15 thence from the hoisting unit 16 to the controller-processor circuit 17. Because of the large mass of data indexing of the logged values is rather important and dependent upon the absolute as well as relative depth positions of the emitting current electrode as well as that of the potential measuring electrodes comprising the electrode assemblies $E_1, E_2 \ldots E_5$.

For example, for measurements taken when array 21 is at position A in FIG. 4, the current electrode of electrode assembly $E_1$ at depth marker $d_k$ coincident with logging station $(d_1)$, is energized. For the array 21 each measuring cycle 1, 2 ... 4 requires the collection of the following analog values: (1) 4-potential difference values, (2) a single absolute potential value associated with a common electrode assembly, (3) a single current intensity value, and (4) a pair of control values related to indicating phase distortion, i.e., indicating distortion via calculated time difference values between the current at the energizing electrode and the absolute potentials at the corresponding potential sensing electrode and the most remote potential sensing electrode. These values are transmitted uphole via cable 12 and thence from hoisting unit 16 to controller-processor circuit 17 for storage, and manipulation in accordance with the method of the present invention.

In order to assure that addresses of the collected current and potential values are complete, the following indices are made of record, vis-a-vis the collected current and potential values, viz.: (i) by depth markers $d_k$, $d_k+a \ldots d_k+8a$ where the factor "a" is the incremental spacing between electrode assemblies $E_1, E_2 \ldots E_5$ and $d_k$ is the absolute depth of the electrode $E_1$ at the start of data collection, viz., when the array is positioned at location A associated with incremental logging time unit 1; (ii) by consecutive numbered electrode logging stations $(d_1, d_2, d_3 \ldots d_8)$ associated with the entire logging operation as where the relative position of each station is of interest; (iii) by scan depth station number $(Sd_1, Sd_2,$ etc.) associated with the depth of the mid-central electrode assembly, viz., $d_k+2a, d_k+3a, d_k+4a$, and $d_k+5a$, respectively, at the occurrence of the four depicted collection cycles. These values can be indexed in a number of different formats as the data is collected, typical of which being displays 46, 47, 48, 49 and 50, and then being re-indexed in matrix gather format as set forth in display 51. It should be further noted that the displays 46, 47 ... 50 have a further annotation tag: viz., that the depicted values forming each such display must be further indexed to indicate the depth of the current electrode of electrode assemblies used as the current emitter during each of the collection cycles 1, 2, 3 . . . which give rise to displays 46, 47 . . . 50, respectively. Such annotation system can also be carried over into the re-indexed matrix gather display 51 of the impedance values associated with these measurements, as explained below.

That is to say, assume that absolute depths of the numbered logging stations are known; so that when the array 21 is located at position A then the electrode assemblies $E_1$, $E_2$, $E_3$ . . . will be associated with the internal numbering index 1 . . . 5 of consecutive order; hence, when the current electrode of electrode assembly $E_1$ is at depth $d_k$ coincident with logging station $d_1$ and measurements at the associated electrode assemblies taken, then the absolute and differential potential values and current intensity would be indicated by the following quantities:

$$V_{1,1}(d_k)$$
$$\Delta V_{2,1}(d_k)$$
$$\Delta V_{3,1}(d_k)$$
$$\vdots$$
$$\Delta V_{5,1}(d_k)$$
$$J_1(d_k)$$

Note with respect to the indices for the absolute potential that the first subscript relates to the internal index number of the 5-electrode array at which the potential measurement occurs and the second subscript identifies the internal index number of the current electrode undergoing energization while the address in parenthesis relates absolute depth from say the earth's surface 15 to the position of the current electrode undergoing activation. In regard to the last-mentioned address tag, the logging station of the current electrode, viz., logging station ($d_1$), could be used also as a substitute since absolute depth can be later calculated.

Note that the potential differences are measured between the pairs of electrode assemblies, i.e., between electrode assemblies 1 and 2; 2 and 3; 3 and 4; etc., these values are also indexed in a similar manner as above. That is, in accordance with the following:

$$\Delta V_{i,1}(d_k) \text{ where } i=2\ldots 5.$$

Note that in the above, the first subscript relates the position of the deeper of each pair of electrode assemblies and assumes that the normalizing value for forming the difference potential value relates to the descending ordered electrode assembly. That is, the value $$\Delta V_{2,1}(d_k)$$

indicates that the potential difference is measured between the potential electrodes of assemblies $E_1$ and $E_2$ internally numbered as 1 and 2, respectively, and that the current electrode energized has an internal index number of 1, at a depth ($d_k$), while the value $$\Delta V_{4,1}(d_k)$$

indicates that the potential difference is measured between assemblies $E_3$ and $E_4$ having internal index numbers 3 and 4 in FIG. 4, with the current emitter being associated with the internal numbered assembly 1, at the marker depth $d_k$. Note that depiction of the aforementioned values as set forth above, comprises entries of columns 46a, 46b, and 46c of display 46, the current intensity being the sole entry of column 46c while the time measurements [$T_1(d_k)$ and $T_5(d_k)$] associated with indicating phase distortion, if any, are set forth as the entries of column 46d.

With the array stationary, the next step of the method in accordance with the invention is to activate the current electrode of electrode assembly $E_2$ identified as internal index number 2, and measure the absolute voltage at assembly $E_1$ and the potential difference values between adjacent pairs of electrode assemblies $E_1$ . . . $E_5$, as well as the current intensity. That is provide the values $$V_{1,2}(d_k+a)$$

$$V_{i,2}(d_k+a)$$

where $i=2, 3, \ldots 5$; and $$J_2(d_k+a)$$

In addition, a pair of control values [$T_2(d_k+a)$ and $T_5(d_k+a)$] that indicate the degree of phase distortion are also measured. These values occupy entries of columns 47a, 47b, 47c, and 47d of display 47.

Thereafter, the current electrodes having internal index numbers 3, 4, and 5 are sequentially activated and at each time of occurence, the absolute voltage at assembly $E_1$, the potential differences between adjacent pairs of electrode assemblies, the current intensity and the pair of phase control values are measured, viz.

$$V_{1,3}(d_k + 2a)$$
$$\Delta V_{i,3}(d_k + 2a)$$
$$J_3(d_k + 2a)$$
$$T_3(d_k + 2a); T_5(d_k + 2a)$$
$$V_{1,4}(d_k + 3a)$$
$$\Delta V_{i,4}(d_k + 3a)$$
$$J_4(d_k + 3a)$$
$$T_4(d_k + 3a); T_1(d_k + 3a)$$
$$V_{1,5}(d_k + 4a)$$
$$\Delta V_{i,5}(d_k + 4a)$$
$$J_5(d_k + 4a)$$
$$T_5(d_k + 4a); T_1(d_k + 4a)$$

where $i=2, 3, 4,$ and 5.

The above described values occupy entries of columns 48a, 48b . . . ?d of display 48; columns 49a, 49b . . . 49d of display 49; and columns 50a, 50b . . . 50d of display 50.

Table I, below, sets forth the measurements with logging operations A, B, C, and D associated with displays 46 . . . 50 in tabular form for greater clarity.

TABLE I

| C46a | C46b | C46c | C46d | |
|---|---|---|---|---|
| $V_{1,1}(d_1)$ | $\Delta V_{2,1}(d_1)$<br>$\Delta V_{3,1}(d_1)$<br>$\Delta V_{4,1}(d_1)$<br>$\Delta V_{5,1}(d_1)$ | $J_1(d_1)$ | $T_1(d_1)$<br>$T_5(d_1)$ | = DISPLAY 46 |
| C47a | C47b | C47c | C47d | |
| $V_{1,2}(d_2)$ | $\Delta V_{2,2}(d_2)$<br>$\Delta V_{3,2}(d_2)$<br>$\Delta V_{4,2}(d_2)$<br>$\Delta V_{5,2}(d_2)$ | $J_2(d_2)$ | $T_2(d_2)$<br>$T_5(d_2)$ | = DISPLAY 47 |
| C48a | C48b | C48c | C48d | |
| $V_{1,3}(d_3)$ | $\Delta V_{2,3}(d_3)$<br>$\Delta V_{3,3}(d_3)$<br>$\Delta V_{4,3}(d_3)$<br>$\Delta V_{5,3}(d_3)$ | $J_3(d_3)$ | $T_3(d_3)$<br>$T_5(d_3)$ | = DISPLAY 48 |
| C49a | C49b | C49c | C49d | |

TABLE I-continued

| $V_{1,4}(d_4)$ | $\Delta V_{2,4}(d_4)$<br>$\Delta V_{3,4}(d_4)$<br>$\Delta V_{4,4}(d_4)$<br>$\Delta V_{5,4}(d_4)$ | $J_4(d_4)$ | $T_4(d_4)$<br>$T_1(d_4)$ | = DISPLAY 49 |
|---|---|---|---|---|
| C50a | C50b | C50c | C50d | |
| $V_{1,5}(d_5)$ | $\Delta V_{2,5}(d_5)$<br>$\Delta V_{3,5}(d_5)$<br>$\Delta V_{4,5}(d_5)$<br>$\Delta V_{5,5}(d_5)$ | $J_5(d_5)$ | $T_5(d_5)$<br>$T_1(d_5)$ | = DISPLAY 50 |

LEGEND:
$(d_1) = (d_k)$;
$(d_2) = (d_k + a)$;
$(d_3) = (d_k + 2a)$;
$(d_4) = (d_k + 3a)$; and
$(d_5) = (d_k + 4a)$.

From the above-denoted measured values of potential and current intensity, their corresponding ratio, i.e., measured values associated with the same set of electrical variables depicted within each display 46, 47, 48, . . . 50 can be determined using the following indices and equation, viz., $$Z_{1,1}(d_k) = V_{1,1}(d_k)/J_1(d_k)$$
$$\Delta Z_{i,1}(d_k) = \Delta V_{i,1}(d_k)/J_1(d_k)$$
$$Z_{1,2}(d_k + a) = V_{1,2}(d_k + a)/J_2(d_k + a)$$
$$\Delta Z_{i,2}(d_k + a) = \Delta V_{i,2}(d_k + a)/J_2(d_k + a)$$
$$\vdots$$
$$Z_{1,5}(d_k + 4a) = V_{1,5}(d_k + 4a)/J_5(d_k + 4a)$$
$$\Delta Z_{i,5}(d_k + 4a) = \Delta V_{i,5}(d_k + 4a)/J_5(d_k + 4a)$$

where $i = 2, 3 \ldots 5$.

Thereafter, the above results associated with the above equations can be re-indexed in matrix gather format to generate the display 51 as previously mentioned. Note in this regard that the matrix entries set forth in the display 51 preserve the one-to-one relationship of the current and potential values collected with the logging array 21 at the different logging positions in FIG. 4. These entries are set forth in tabular form in Table II and are easily annotated from the precursor potential and current values found in Table I. In comparing the entries of Tables I and II, note that the scan depth $(Sd_1)$ of the depicted matrix gather is coincident with depth marker $(d_k + 2a)$.

TABLE II

| C1 | C2 | C3 | C4 | C5 | |
|---|---|---|---|---|---|
| $\underline{\Delta Z}(Sd_1) =$ | | | | | |
| $Z_{1,1}(d_1)$ | $Z_{1,2}(d_2)$ | $Z_{1,3}(d_3)$ | $Z_{1,4}(d_4)$ | $Z_{1,5}(d_5)$ | R1 |
| $\Delta Z_{2,1}(d_1)$ | $\Delta Z_{2,2}(d_2)$ | $\Delta Z_{2,3}(d_3)$ | $\Delta Z_{2,4}(d_4)$ | $\Delta Z_{2,5}(d_5)$ | R2 |
| $\Delta Z_{3,1}(d_1)$ | $\Delta Z_{3,2}(d_2)$ | $\Delta Z_{3,3}(d_3)$ | $\Delta Z_{3,4}(d_4)$ | $\Delta Z_{3,5}(d_5)$ | R3 |
| $\Delta Z_{4,1}(d_1)$ | $\Delta Z_{4,2}(d_2)$ | $\Delta Z_{4,3}(d_3)$ | $\Delta Z_{4,4}(d_4)$ | $\Delta Z_{4,5}(d_5)$ | R4 |
| $\Delta Z_{5,1}(d_1)$ | $\Delta Z_{5,2}(d_2)$ | $\Delta Z_{5,3}(d_3)$ | $\Delta Z_{5,4}(d_4)$ | $\Delta Z_{5,5}(d_5)$ | R5 |

LEGEND:
$(Sd_1 = d_3 = d_k + 2a)$
Logging Stations $d_1, d_2, d_3, d_4$, and $d_5$ are equal to $d_k$; $d_k + a$; $d_k + 2a$; $d_k + 3a$; and $d_k + 4a$, respectively;
Z = absolute impedance;
$\Delta Z$ = differential impedance; and
$\underline{\Delta Z}$ = modified impedance matrix for scan depth $Sd_1$.

In Table II note that the entries addressed by row, viz., row R1, R2, R3, R4, or R5, and by column, viz., column C1, C2, C3, C4, or C5, are obtained by direct measurement and not by means of reciprocity, and that annotation as to depth of survey scan is in accordance with Depth scan depth $= d_k + Na$, $M = 2N + 1$.

That is to say, for the instance where $d_k + Na$ is equal to $d_k + 2a$ for the matrix of Table II, the scan gather depth is the midpoint of the extreme depths $d_k$ and $d_k + 4a$ and is thus is defined by the above equation.

As to a general relationship of the rows and columns of the matrix of Table II, it is noted that the diagonal and supradiagonal entries (i.e., entries above the diagonal) require entries from Table I for those situations for which the active current electrode for the array never lies above the electrode assemblies of the array at which potentials are measured. It follows that the subdiagonal elements of the matrix (those entries below the diagonal) require entries from Table I for those situations for which the active current electrode for the array never lies below the electrode assemblies at which potentials are measured when the array 21 is in position A.

Thereafter, the logging array 21 of FIG. 4 is lowered in sequence to logging positions B, C, and D and the above-described collection process is repeated. Result each location B, C, or D can be associated with sets of precursor current, potential and phase displays, generally indicated at 52, 53, and 54, which in turn result in the generation of associated matrix gathers 55, 56, and 57 in a manner similar to that previously described wherein each determined matrix gather 55 . . . 57 preserves the one-to-one relationship of the current and potential values collected during positioning of the logging array at positions B, C, or D.

FIG. 5 illustrates gather 51 associated with logging position A, as well as gathers 55, 56, and 57 of positions B, C, and D, respectively, in more detail.

As shown, the entries comprising each display 51, 55, 56, or 57 are seen to have the following common characteristics: (i) they are related to precursor measured values within the formation adjacent to the borehole; (ii) they are indexed to a particular zone within the earth by a mid-point depth marker coincident with the mid-central electrode assembly of the array, and by two depth values that define the bounds of the zone of interest at the time of collection; and (iii) they are also indexed to a particular scanning depth station number associated with the depth of the mid-central electrode assembly. That is to say, each of the entries forming the matrix gathers of displays 51, 55, 56, and 57 represents the ratio of selected measured potential and current values systematically generated by the array 21 at logging locations A . . . D in FIG. 4.

As can be seen in FIG. 5, indexing is as follows: each display 51, 55, 56, and 57 comprises a 5×5 matrix of impedance values. Rows of the matrix are denoted by R1, R2 . . . R5, while columns are specified by C1, C2 . . . C5. Increasing order of the matrix entries is from left-to-right and top-to-bottom, respectively. That is to say, the columns C1, C2 . . . C5 increase from left-to-right as a function of ordered increases in depth of the current electrode and each of the columns C1, C2 . . . or C5 has a common current electrode numerical identifier and a common depth identifier associated with the index number of the common current electrode of each column. Additionally, each column is identified with a sequentially increasing internal indexing number of the potential measuring electrodes of the array.

Within each of the rows R1, R2 . . . R5 it is seen that the entries increase in depth from left-to-right as viewed, viz., increasing from the smallest depth value for the entry at the left of the rows as viewed, ending with the largest depth value at the right of the display. Note also that each row R1 ... R5 has a common potential electrode numerical identifier associated within each such row but from row-to-row, such identifier sequentially increases from top to bottom as viewed.

As a result of indexing the measured impedance values as set forth in the displays 51, 55, 56, and 57, the interpreter can easily synthesize operations of different types of logging arrays so as to provide a multiplicity of different current penetration patterns and hence more easily determine the resistivity changes as a function of lateral distance into the formation under survey.

It should be noted that while the zone of resolution of each display 51, 55, 56, and 57 is fixed by the active length of the array (and thus in FIG. 4 is equal to 5 logging stations), individual impedance entries making up each display can be the average of several values since the latter are associated with common logging stations. For example, in viewing the logging positions A, B, C, and D in FIG. 4, it is evident that there are two (2) logging stations for which precursor measurements are obtained each time collection occurs, viz., stations $d_4$ and $d_5$. Hence impedance entries associated with these stations can be an average of the four obtained precursor measurements, if desired, and that average entry may be used in the resulting displays.

It should be further noted that while each of the displays 51, 55, 56, and 57 only represents a $5 \times 5$ matrix, in actual ooerations there are many more entries per matrix gather. For example, if the last numbered electrode assembly of the logging array is designated by the number "M", then there are $M \times M$ entries per matrix gather. However, note that one row, usually the R1 row, will be populated by absolute impedance values and the remaining rows, viz., R2, R3 . . . RM will be composed of differential impedance values determined by dividing the voltage difference between adjacent pairs of potential electrode of the logging array, and the energizing current. Because of the existence and operability of the principle of linear superposition, the resulting matrix has the attribute of being able to systematically relate any arbitrary set of synthetic emitting currents of the logging array to a corresponding differential potential distribution on any selected number of potential electrodes of the array in accordance with $$\underline{\Delta V}[d_k+Na]=\underline{\Delta Z}[d_k+Na]*\underline{J}[d_k+Na]$$

where (—) indicates a matrix or vector quantity; the depth $d_k+Na$ corresponds to that of the scan depth number associated with a particular matrix; and $\Delta V$ and $J$ are $M \times 1$ column vectors given by:

$$\underline{\Delta V}(d_k + Na) = \begin{bmatrix} V_1(d_k) \\ \Delta V_2(d_k + a) \\ \cdot \\ \cdot \\ \cdot \\ \Delta V_M(d_k + [M-1]a) \end{bmatrix}$$

-continued $$\underline{J}(d_k + Na) = \begin{bmatrix} J_1(d_k) \\ J_2(d_k + a) \\ \cdot \\ \cdot \\ J_M(d_k + [M-1]a) \end{bmatrix}$$

Furthermore, thus $\Delta Z[d_k+Na]$ is the $M \times M$ modified formation impedance matrix gather akin to that set forth in displays 51, 55, 56, or 57 of FIG. 5 when referenced to scan depth $d_k+Na$, and has the following form:

$$\begin{bmatrix} Z_{1,1}(d_k) & Z_{1,2}(d_k + a) & \ldots & Z_{1,M}(d_k + [M-1]a) \\ \Delta Z_{2,1}(d_k) & \Delta Z_{2,2}(d_k + a) & \ldots & \Delta Z_{2,M}(d_k + [M-1]a) \\ \Delta Z_{3,1}(d_k) & \Delta Z_{3,2}(d_k + a) & \ldots & \Delta Z_{3,M}(d_k + [M-1]a) \\ \cdot & \cdot & & \cdot \\ \cdot & \cdot & & \cdot \\ \Delta Z_{M,1}(d_k) & \Delta Z_{M,2}(d_k + a) & \ldots & \Delta Z_{M,M}(d_k + [M-1]a) \end{bmatrix}$$

UPHOLE AND DOWNHOLE HARDWARE

In order to provide accurate control to the logging array, the present invention of FIG. 1 contemplates using surface control circuitry to monitor downhole operations, that is, to use a controller within processor-controller circuit 17 of van 18 at the earth's surface to clock operations of a slave controller within midsection 30 within the logging array 21 of FIG. 1.

FIGS. 6 and 7 illustrate such operations in detail wherein up-hole circuitry is set forth in FIG. 6 and downhole circuitry in FIG. 7.

As shown in FIG. 6, circuit 17 includes a master clock 60 for controlling receive/transmit circuit 61, master input logic circuit 63, and I/O circuit of digital computer 64 through timing logic circuit 65. Logging data of a format and character to be described hereinafter, passes upward from logging array 21 through cable 12 over pulley 13 of derrick 14. Next, the data is transmitted through hoisting unit 16 via conductor 19 to the receive/transmit circuit 61 and thence through the master input logic circuit 63 to digital computer 64. At the computer 64, the data is displayed in real time at display unit 66 (say, to check for phase distortion) and then after calculations have been completed, the final matrix is recorded on recorder 67. Since the logging data is initially in a format that is incompatible with computer operation it must first be demultiplexed at master input logic circuit 63 (i.e., changed from serial to parallel format) and then indexed with depth markers from depth encoder 62 attached to hoisting unit 16. To provide proper word and block lengths to the data compatible with processing within computer 64, the master logic circuit 63 is carefully controlled using the timing logic circuit 65 in conjunction with master clock 60.

As to depth encoder 62, note that in operations such depth encoder provides the absolute depth of a reference location of the array 21 relative to the earth's surface 15 (preferably based on the depth of the shallowest electrode assembly of the loqging array at each stationary logging position). The depth associated with measurements originating at the remaining electrode assemblies of the array 21 of FIG. 1 is determined from the known spacing "a" between adjacent electrode assemblies $E_1, \ldots, E_M$.

In operation, the master clock 60 produces a series of timing (clock) pulses which are applied to logic circuit 65 and thence to the remaining circuits to dictate when such circuits are to perform. Each operation usually requires a certain number of clock pulses, and consequently, the timing to complete one of the various operations is an exact multiple of the clock pulses. For example, the readout of master input logic circuit 63 is achieved during a specific interval of time that is an exact multiple of the clock pulses from master clock 60. As one subset of circuits is disabled, a new subset is enabled by the time pulses so as perform new operations. In this regard, note that format control unit 68 is capable of manual changes during data transfer to computer 64. In that way the format of the data can be varied to meet different interpretational requirements as occurring at the real time display unit 66 and at the data recorder 67 in the manner previously discussed.

As previously mentioned, FIG. 7 illustrates downhole circuitry in detail.

As shown, a clock 80, in conjunction with timing and control logic 81, is used to control operations of electrode assemblies $E_1, E_2 \ldots E_M$ of the logging array generally indicated at 21 in the FIG., in conjunction with and in response to the uphole timing circuitry of processor-controller circuit 17. In more detail, assume that clock 80 is free running, and an initialization signal 79 from the uphole circuitry 17 appears at timing and control logic 81 and initiates operation. Also assume that by means of the start signal 79, initialization with the remaining circuit elements of the downhole circuitry has occurred. That is, using an initialization signal from timing and control logic 81, the following elements (formatter/transmit buffer 85; A/D converter 86; gain control logic 87; and multiplexers 84 and 89) are correctly initialized to begin operation.

Simultaneously, counter 90, associated with current generator 91, is initialized and operations begin to allow current injection via current switch 95 to particular electrodes $Ec_1, Ec_2, \ldots, Ec_M$ of the electrode assemblies $E_1, E_2, \ldots, E_M$ in sequence.

That is to say, after current generator 91 is activated to inject current into the formation, current intensity, as well as particular absolute and difference potentials at the potential electrode assemblies $E_1, \ldots, E_M$ are measured and passed to the data acquisition circuits. More specifically, the absolute potentials are passed to comparator 83a via multiplexer 84, while at the same time the absolute potential of electrode assembly $E_1$ and all difference potentials are passed to multiplexer 89, A/D converter 86 and formatter/transmit buffer 85 via sample/hold circuits 88a, 88b, ..., 88m using particular binary gain amplifiers of a series of such amplifiers generally indicated at 97 and 98. Phase measurements at any of the electrode assemblies can be obtained by means of comparators 83a via the output of multiplexer 84. Note that comparators 83b and 83c are permanently connected to the outputs of amplifiers 97a and 97m, respectively.

In this regard, it should be recalled that the gain associated with these downhole measurements is used to increase accuracy, i.e., correctly indicate the magnitude of the detected measurements being amplified by particular amplifiers 97 and 98. But to avoid overloading the individual amplifiers 97 and 98 gain must be varied in accordance with the signal to be amplified. The gain of each amplifier is controlled by the gain control logic 87 on the basis of the magnitude of the signal during the previous measurement cycle. The gain information from each amplifier is passed to formatter/transmit buffer 85 together with the output from the A/D converter 86 and becomes a part of the final data word.

Current Intensity

In FIG. 7, current intensity is seen to be measured via binary gain amplifier 100 whose gain is also controlled by gain control logic 87. For a useful current range of 500 microamperes to 10 amperes, the resistor 101 in the current path should not exceed 0.1 ohm, resulting in a voltage input to the amplifier 100 in a range from 50 microvolts to 1 volt. Hence, its programmable gain is in binary steps ranging from 5 to 100,000 and requires at least 15-bit gain code.

Phase Measurements

In order to obtain the phase of the potentials at the electrode assemblies, the interval times between zero crossings of the signal versus the phase reference, i.e., the start of the current sine wave, are measured. The content of counter 90 serves as the phase reference and is loaded into phase registers 92a, 92b and 92c at the precise instant the comparators 83a, 83b and 83c detect a zero crossing of the corresponding potential signals. The phase of the potential signal can be determined at any of the electrode assemblies from the above information, however, in the present embodiment only the phase of the far electrode assembly and the assembly at which the current is being ejected is desired. Any change in the counts indicated in a given phase register is directly proportional to phase distortion providing a direct indication of reliability of the associated measurements.

Absolute and Differential Potential Measurements

In order to provide a current intensity J at electrode $Ec_1$ of the electrode assembly $E_1$, the following must occur in sequence: first, counter 90 is reset via a reset signal from timing and control logic 81. Clock pulses at the input of counter 90 increment its content until a complete current cycle is generated. The sine lookup table D/A converter 102 then converts the content of counter 90 to produce a series of discrete current values whose individual amplitudes vary sinusoidally with time. After amplification via amplifier 103, the sinusoidally varying current is gated through current switch 95 to the current electrode $Ec_1$ of the electrode assembly $E_1$ and thence into the adjacent formation in the manner previously described. In this regard, it is assumed that the electrode assemblies that make up the generic logging array now being described have essentially infinite internal impedances so that they do not draw appreciable current from the surrounding medium and they are physically small ringlets as previously described so that their presence does not tend to alter significantly the potential field in the vicinity of the outer surface of the array. Additionally, the current from the current electrode, of course, must return to close the measuring circuit and this is done by means of remotely located return electrode 28 of FIG. 1. The return electrode 28, for all practical purposes, appears to be located at infinity.

The absolute voltage at common electrode assembly $E_1$ is measured with respect to a normalizing reference potential such as provided by reference electrode 29 of FIG. 1, along with all differential potentials at all adjacent pairs of potential electrodes $Ep_1$, $Ep_2$ ... $Ep_M$ of the electrode assemblies $E_1$, $E_2$ ... $E_M$ comprising the array 21. That is to say, the absolute potential at potential electrode $Ep_1$ of assembly $E_1$ is indicated via amplifier 97a, while potential differences of adjacent pairs of assemblies $E_2$, $E_3$ ... $E_M$ are measured by means of differential binary gain amplifiers 98b, 98c, ..., 98m.

Thereafter, the collection process is repeated using gating circuit 95 to activate the next adjacent electrode assembly with current, viz., the current electrode $Ec_2$ of assembly $E_2$. Absolute potential is measured at common electrode $Ep_1$ using amplifier 97a, while potential differences of the adjacent pairs of assemblies $E_2$, $E_3$, ... $E_M$ are measured by means of amplifiers 98b, 98c ... 98m in similar fashion as discussed above. After all electrode assemblies have been current activated as discussed above, the array is moved one logging station—either up or down—, and the entire collection process is repeated.

It should be noted that as the collection cycle is repeated, at the earth's surface 15, the measurements are annotated and then processed to provide impedance entries of a series of finite, overlapping matrix gathers associated with a series of depth intervals. That is to say, each gather of impedance entries is indexed to a selected mid-central depth interval dependent on the active length of the electrode array (between electrodes $E_1$ and $E_M$) that defines the shallow and deep depth limits of each such gather.

It remains now to indicate briefly how the data may be measured and then transmitted uphole based on data records divided into words and blocks compatible with the computer 64. A brief description of the collection and transmission format is in order and is set forth below.

COLLECTION, TRANSMISSION AND TAPE FORMAT

A data record (also referred to previously as a matrix gather) consists of depth information provided by the depth encoder 62 of FIG. 6 followed by data collected by the array 21 of FIG. 1 as outlined previously.

More specifically, with the tool stationed at a preselected depth, depth information is input to digital computer 64 via master input logic 63, and a start signal to the tool is transmitted via receive/transmit circuit 61. As previously described, this start signal initiates the data collection process whereby (i) absolute potential data, (ii) difference potential data, (ii) current intensity data, and (iv) phase data are transmitted sequentially via formatter/transmit buffer 85 in a predetermined sequence to controller-processor circuit 17, as indicated at FIG. 7.

Each data word consists of the 16-bit output from the A/D converter plus a maximum of 16 bits for the corresponding gain code. Measurements at the electrodes are gain-indexed. Gains must be set in binary steps from 10 to 3500 for absolute potential measurements (requiring a 9-bit gain code); from 10 to 200,000 for potential difference measurements (requiring a 15-bit gain code); and from 5 to 100,000 for current measurements (requiring a 15-bit gain code). The phase measurement does not require a gain code.

The amount of data contained in a data record as outlined above is determined by the number of active electrode assemblies on the tool. For example, assuming that 73 active electrode assemblies are utilized, this will result in 1 absolute potential, 72 difference potentials, 1 current intensity and 2 phase measurements, and correspondingly, 74 gain codes, giving a total of $$(76+74)*(73)*(16) = 175,200 \text{ bits}$$

of information per data record.

The present invention does of course not preclude the possibility of collecting the above-mentioned data record repeatedly with the tool remaining at the current depth station in order to allow the use of signal enhancement processing methods to reduce the effects of environmental noise on the quality of the impedance elements.

Simultaneously with the real-time processing of the acquired data, it is possible to transfer the information to a storage device such as magnetic tape for later access in processing. The particular format that one chooses for this purpose is somewhat arbitrary but should possibly be dictated by convenience with respect to characteristics of the recording device and the nature of the subsequent processing.

For comprehensive identification purposes, data records are preceded by header information which, in addition to the usual information describing time, site, etc., should also contain data describing such parameters as electrode spacing "a", mandrel diameter, number of active electrodes used in collecting the data, potential reference electrode location, etc.

Now after briefly describing the format of the collected and transmitted logging data, the annotation aspects of the method of the invention have been simplified.

(1) Since the electrode assemblies $E_1 \ldots E_M$ are bifurcated forming first and second ringlets, they essentially occupy the same depth coordinate. That is to say, the axial distance between the ringlets is so small compared to the distance between adjacent electrode assembly pairs that for purposes of discussion they occupy the same general depth location as previously defined.

(2) In order to manipulate the quantities as functions of several different variables in a rapid manner, the electrode assemblies $E_1$, $E_2$ ... $E_M$ are numbered using the indexing function previously defined, beginning at the top of the mandrel and ending at the deepest point of the mandrel in the borehole. The mid-central electrode assembly is numbered $N+1$ and deepest positioned electrode assembly is numbered $2N+1=M$. Accordingly, once M is established, the numbering of the electrode assemblies is straight forward. That is, assume that $M=73$; hence $N+1$ is 37 and the electrode assemblies above the mid-central assembly would be $E_1, E_2 \ldots E_{36}$ and those below would be $E_{38} \ldots E_{73}$.

(3) The measured potential quantities are also indexed, along the lines previously described. That is to say, with the electrode current being emitted from a particular assembly at depth $d_k + (p-1)a$ where p is 1, 2, 3 ... M, the absolute and differential potentials of assemblies $E_1 \ldots E_M$ are indexed based on the internal numbering order of the active assemblies as previously described.

Note that there are $M-1$ potential difference measurements while there is only one absolute voltage measurement each cycle.

From the above obtained current and potential values, their impedance ratios can be readily determined, and indexed as a function current electrode position and potential electrode position, as previously described.

(4) The next step is to repeat the above-described measurements. Indexing of such measurements is as previously stated.

By continuing to displace the array upward or downward along the borehole, one logging station at a time and with the array stationary repeating the collection process, it is seen that a series of impedance measurements can be developed indexed to current position, and potential electrode position. Next, these values can be reindexed to form a matrix gather of impedance entries associated with formation adjacent to the stationary array of FIG. 1 normalized to depth of the zone of traverse of the matrix, the scan station number as well as the depth of the mid-central electrode assembly.

It should be noted that because of the principle of linear superposition the impedance matrix gathers provided by the method of the present invention have the attribute of being able to relate an arbitrary set of currents issuing from the M electrodes to the corresponding absolute potential and potential difference distribution appearing on the M electrodes, with respect to the remote reference electrode as previously mentioned.

As a final matter, note the impedance gathers of the present invention can systematically comprise an extremely large number of entries, viz., if the last electrode is designated "M" then there are M×M entries. However only one row consists of impedance entries derived from absolute potential measurements at the electrode assemblies of the array. Accordingly the greater number of entries consists of impedance values calculated from potential differences between adjacent pairs of electrode assemblies, viz., equal to M−1 rows of entries. These entries define a modified formation impedance matrix indexed as previously described.

END USE OF THE DATA

Assume that the improved impedance entries of each matrix gather have been determined in accordance with the steps of the method of the present invention. Then based upon the superposition principle, any arbitrary set of electrode currents to a corresponding set of absolute voltages and voltage differences between adjacent electrode assemblies can be related by such determined impedance entries. That is, for a set of drive currents, a corresponding set of voltage differences between a selected number of electrode assemblies, can be expressed as a system of linear equations in terms of vectors $\underline{\Delta V}$, $\underline{J}$ and the $\underline{\Delta Z}$ matrix, viz.:

$$\underline{\Delta V} = \underline{\Delta Z} * \underline{J}$$

where (−) indicates a matrix or vector quantity,
$\underline{\Delta V}^T = [V_1(V_2-V_1)(V_3-V_2)\ldots(V_M-V_{M-1})]$, and $\underline{J}^T = [J_1, J_2 J_3 \ldots J_M]$ wherein $\ldots \underline{\Delta V}^T$ and $\underline{J}^T$ are the transpose of vectors $\underline{\Delta V}$ and $\underline{J}$, respectively.

Based upon the particular formation characteristic sought for analysis in order to further the exploration process, the above relationship can be modified to provide such a determination. For example, in Stelzer, op. cit, the apparent resistivity of a selected synthetic array is determined by linear combination of the normalized synthetic voltage values divided by a quantity productized with a linear combination of the reciprocals of the absolute effective linear distances among the several electrodes. Moreover, if the effective radii of the electrodes of the logging array are the same and the reference voltage electrode is sufficiently removed from affecting operations, then the last-mentioned quantity is negligible and resistivity is a direct function of the synthetic voltage entries.

In accordance with the present invention such resistivity responses can be determined in similar fashion except that the linear combination of voltages previously generated amongst the electrode assemblies (based on conventional matrix algebraic principles) uses impedance entries calculated from precursor measured values which resulted from measured potential differences between adjacent pairs of electrode assemblies. In the great majority of cases, the impedance entries of the matrix are also normalized to a particular zone or segment of the earth formation as determined by the length of the original logging array. Hence the method of the present invention results in much more accurate final resistivity values than heretofore possible. That is to say, in determining resistivity responses of a particular array configuration, while the art knows of using a synthetic normalizing current of unity, of employing synthetic potential values based on the particular logging configuration, and of using a suitable linear combination of effective linear distances between electrodes based on the particular configuration to be synthesized, there is no hint that a surprising degree in the accuracy of the final results occurs if the synthetic potential values are based upon precursor measurements obtained in the manner taught by the method of the present invention.

Although preferred embodiments of the invention have been described in detail, it should be understood that the invention is not limited thereto as many variations will be readily apparent to those skilled in the art and thus the invention is to be given the broadest possible interpretation within the terms of the following claims appended hereto.

What is claimed is:

1. In synthesizing the true response characteristics of a combination of different hole-centered electric logging tools in a variety of difficult borehole conditions as provided by (1) determining impedance values of an earth formation penetrated by a borehole filled with a drilling mud of resistivity (Rm), and (2) selectively manipulating the impedance values as impedance entries of a matrix so as to synthesize operations of different hole-centered tools over an associated depth increment with surprising accuracy, a method of providing said impedance entries for a series of matrix gathers, each gather being indexed to one of a series of finite, but overlapping depth scan increments of the formation measured along the borehole, each scan increment being dependent on the array length L of the electrode array to define shallow and deep depth markers as well as being centrally indexed to the depth in the borehole of a mid-central electrode assembly of the array at the time of data collection, and thereby provide a true indication of the formation resistivity (Rt) even though the formation is interspaced from the borehole by an invaded zone of resistivity (Rxo) of unknown lateral extent due to drilling mud filtrate invasion, so that sythesization can occur irrespective of which set of potential or current values are later used as response initiators, comprising:

(i) rigidly attaching an array of M electrode assemblies of equal incremental electrode spacing "a" positioned on a hole-centered mandrel, to a logging cable in which each electrode assembly comprises a current and a potential electrode and has an established internal indexing number;

(ii) positioning the array in the borehole wherein the absolute depth of at least one assembly is continuously known with respect to the earth's surface;

(iii) while the array is substantially stationary within the borehole, injecting current from each of said electrode assemblies—one at a time—into the adjacent formation;

(iv) at each occurrence of current injection, measuring the absolute potential at a common electrode assembly and the potential differences between adjacent pairs of assemblies as a function of internal indexing numbers of active current and potential sensing electrodes of the assemblies used in the measurements;

(v) advancing the array along the borehole an incremental distance equal to the electrode assembly spacing "a" between adjacent assemblies and repeating steps (iii) and (iv), again with the array being substantially stationary within the borehole;

(vi) re-repeating steps (iii)–(v) until the collection of all current and potential data has been completed;

(vii) calculating impedance values from the measured absolute and difference potential values and their associated injected current, each value being indexed to said known internal indexing numbers of active current and potential electrodes used in the measurements;

(viii) reindexing the impedance values into impedance entries of a series of independent, but overlapping matrix gathers, each gather being associated with a predetermined zone of said formation coincident with the depth of the mid-central assembly as the steps (iii) and (iv) occur, and comprising $M \times M$ impedance entries where M is the largest internal indexing number of the array and in which the ratio of the number of difference impedance entries to absolute entries is about $M-1:1$ whereby each $M \times M$ matrix gather is surprisingly useful in deducing true resistivity of the formation even in the presence of high true resistivity to mud resistivity contrasts and irrespective of whether or not synthetic sets of potential or sets of current values are later used as initiators of subsequently generated responses of computer focused synthetic tool arrays.

2. Method of claim 1 in which the array of M electrode assemblies comprises assemblies $E_1, E_2 \ldots E_M$ and the internal indexing order thereof begins at assembly $E_1$ and ends at assembly $E_M$ where $E_1$ is the shallowest assembly of the array and $E_M$ is the deepest assembly relative to the earth's surface.

3. Method of claim 2 in which the length L of the array comprising electrode assemblies $E_1, E_2 \ldots E_M$, is the vertical distance separating the shallowest electrode assembly $E_1$ and the deepest assembly $E_M$ along the borehole.

4. Method of claim 3 in which the length L of the array also defines a zone of formation that is related—by depth—to the calculated impedance entries of each $M \times M$ matrix of step (viii).

5. Method of claim 1 in which the entries of each $M \times M$ matrix comprises M columns and M rows of impedance entries wherein the M columns are each associated with a common depth within the formation associated with a known current electrode.

6. Method of claim 5 in which the known current electrode of each column of said $M \times M$ matrix is an internally numbered current electrode that signifies the common current electrode from whence the drive current by which the impedance entry was calculated, originated.

7. Method of claim 5 in which the M rows of each $M \times M$ matrix are each associated with a common internally numbered potential electrode signifying the common potential electrode where whence absolute and difference potential values for calculating the impedance entries, are associated.

8. Method of claim 6 in which each of the M columns of each $M \times M$ matrix is associated with potential electrodes whose internally numbering index sequentially changes in a known order from row to row along each column.

9. Method of claim 7 in which each of the M rows of each $M \times M$ matrix is associated with potential electrodes whose internally numbering index sequentially changes in a known order from column to column along each row.

10. Method of claim 5 in which M is 5.

11. Method of claim 10 in which the columns of the $5 \times 5$ matrix are made up of absolute impedance entries $Z$'s and modified difference impedance entries $\Delta Z$'s and wherein the columns are provided with a sequentially increasing numbering order that begins with 1 and ends with 5 and wherein each of the columns of the matrix has a common internally ordered current electrode from whence originated the drive current by which each impedance entry was calculated, and the rows of the $5 \times 5$ matrix are provided with a sequentially increasing numbering order that begins with 1 and ends with 5 wherein each of the 5 rows has a common internally ordered potential electrode from whence an absolute or difference potential value associated with each impedance entry, was determined.

12. Method of claim 11 in which the impedance entries of the $5 \times 5$ matrix are each identified by a first subscript associated with the internally numbered potential electrode from whence the absolute or difference potential value by which the impedance entry was calculated, was originally associated, followed by a comma and then a second subscript associated with the internally numbered current electrode from whence originated the drive current associated with the impedance calculation.

13. Method of claim 12 in which the subscripts of the absolute impedance entries, $Z$'s, and the difference impedance entries $\Delta Z$'s of the $5 \times 5$ matrix are of the following order:

$$\underline{\Delta Z}(Sd_1) = \begin{bmatrix} Z_{1,1}(d_1) & Z_{1,2}(d_2) & Z_{1,3}(d_3) & Z_{1,4}(d_4) & Z_{1,5}(d_5) \\ \Delta Z_{2,1}(d_1) & \Delta Z_{2,2}(d_2) & \Delta Z_{2,3}(d_3) & \Delta Z_{2,4}(d_4) & \Delta Z_{2,5}(d_5) \\ \Delta Z_{3,1}(d_1) & \Delta Z_{3,2}(d_2) & \Delta Z_{3,3}(d_3) & \Delta Z_{3,4}(d_4) & \Delta Z_{3,5}(d_5) \\ \Delta Z_{4,1}(d_1) & \Delta Z_{4,2}(d_2) & \Delta Z_{4,3}(d_3) & \Delta Z_{4,4}(d_4) & \Delta Z_{4,5}(d_5) \\ \Delta Z_{5,1}(d_1) & \Delta Z_{5,2}(d_2) & \Delta Z_{5,3}(d_3) & \Delta Z_{5,4}(d_4) & \Delta Z_{5,5}(d_5) \end{bmatrix}$$

where:
- $d_1$ is the depth of the shallowest electrode assembly of the array,
- $d_2$ is the depth of the next shallowest electrode assembly $E_2$,
- $d_3$ is the depth of the mid-central electrode assembly $E_3$,
- $d_4$ is the depth of the next to deepest electrode assembly $E_4$, and
- $d_5$ is the depth of the deepest electrode assembly $E_5$.

14. Method of claim 13 in which a depth address of the internally numbered current electrode from whence originated the drive current by which each impedance entry was calculated, is also provided each impedance entry.

15. Method of claim 5 in which the columns of the M×M matrix are made up of absolute impedance entries Z's and modified difference impedance entries ΔZ's and wherein the columns are provided with a sequentially increasing numbering order that begins with 1 and ends with M where M is a whole number equal to the total number of electrode assemblies comprising the array, and wherein each of the M columns of the matrix has a common internally ordered current electrode from whence originated the drive current by which each impedance entry was calculated, and the rows of the M×M matrix are provided with a sequentially increasing numbering order that begins with 1 and ends with M wherein each of the M rows has a common internally ordered potential electrode from whence an absolute or difference potential value associated with each impedance entry was determined.

16. Method of claim 15 in which the impedance entries of the M×M matrix are each identified by a first subscript associated with the internally numbered potential electrode from whence the absolute or difference potential value by which the impedance entry was calculated, was originally associated, followed by a comma and then a second subscript associated with the internally numbered current electrode from whence originated the drive current for the impedance calculation.

17. Method of claim 16 in which the subscripts of the absolute impedance entries Z's, and the difference impedance entries ΔZ's, of the M×M matrix are of the following order:

$$\underline{\Delta Z} = \begin{bmatrix} Z_{1,1}(d_k) & Z_{1,2}(d_k + a) & \ldots & Z_{1,M}(d_k + [M-1]a) \\ \Delta Z_{2,1}(d_k) & \Delta Z_{2,2}(d_k + a) & \ldots & \Delta Z_{2,M}(d_k + [M-1]a) \\ \Delta Z_{3,1}(d_k) & \Delta Z_{3,2}(d_k + a) & \ldots & \Delta Z_{3,M}(d_k + [M-1]a) \\ \vdots & \vdots & & \vdots \\ \Delta Z_{M,1}(d_k) & \Delta Z_{M,2}(d_k + a) & \ldots & \Delta Z_{M,M}(d_k + [M-1]a) \end{bmatrix}$$

where:
- $d_k$ is the vertical distance from the earth's surface to the shallowest electrode assembly $E_1$,
- $a$ is the distance between electrode assemblies $E_1, E_2 \ldots E_M$,
- $d_k + a$ is the depth of the next shallowest electrode assembly,
- $(d_k + [M-1]a)$ is the depth of the deepest electrode assembly $E_M$ of the array.

* * * * *